United States Patent
Nordmeyer

(10) Patent No.: US 7,658,796 B2
(45) Date of Patent: Feb. 9, 2010

(54) CEMENTITIOUS MIXTURES AND METHODS OF USE THEREOF

(75) Inventor: David H. Nordmeyer, Castroville, TX (US)

(73) Assignee: Headwaters Resources, Inc., South Jordan, UT (US)

( * ) Notice: Subject to any disclaimer, the term of this patent is extended or adjusted under 35 U.S.C. 154(b) by 507 days.

(21) Appl. No.: 10/557,756

(22) PCT Filed: Jun. 2, 2004

(86) PCT No.: PCT/US2004/017304

§ 371 (c)(1),
(2), (4) Date: Nov. 18, 2005

(87) PCT Pub. No.: WO2004/108627

PCT Pub. Date: Dec. 16, 2004

(65) Prior Publication Data

US 2006/0260512 A1    Nov. 23, 2006

Related U.S. Application Data

(60) Provisional application No. 60/475,594, filed on Jun. 4, 2003.

(51) Int. Cl.
*C04B 18/06* (2006.01)

(52) U.S. Cl. ........... 106/705; 106/DIG. 1; 405/155; 405/267; 264/333

(58) Field of Classification Search ........... 106/DIG. 1, 106/705; 405/155, 267
See application file for complete search history.

(56) References Cited

U.S. PATENT DOCUMENTS

| | | | |
|---|---|---|---|
| 4,210,457 A | 7/1980 | Dodson et al. | |
| 4,268,316 A | 5/1981 | Wills, Jr. | |
| 4,624,711 A * | 11/1986 | Styron | 106/405 |
| 5,106,422 A * | 4/1992 | Bennett et al. | 106/705 |
| 5,362,319 A | 11/1994 | Johnson | |
| 5,366,548 A | 11/1994 | Riddle | |
| 5,374,307 A | 12/1994 | Riddle | |
| 5,425,807 A | 6/1995 | Riddle | |
| 5,534,058 A * | 7/1996 | Strabala | 106/708 |
| 5,714,002 A | 2/1998 | Styron | |
| 5,853,475 A | 12/1998 | Liskowitz et al. | |
| 6,030,446 A | 2/2000 | Doty et al. | |
| 6,068,803 A | 5/2000 | Weyand et al. | |
| 6,180,192 B1 | 1/2001 | Smith et al. | |
| 6,200,379 B1 * | 3/2001 | Strabala | 106/705 |
| 6,277,189 B1 | 8/2001 | Chugh | |
| 6,334,895 B1 | 1/2002 | Bland | |
| 6,638,355 B2 * | 10/2003 | Shulman | 106/677 |
| 6,645,290 B1 | 11/2003 | Barbour | |
| 6,682,595 B1 | 1/2004 | Barbour | |
| 6,746,531 B1 | 6/2004 | Barbour | |
| 6,780,236 B2 | 8/2004 | Barbour | |
| 2002/0129743 A1 | 9/2002 | Frailey et al. | |
| 2002/0144631 A1 | 10/2002 | Bland | |

OTHER PUBLICATIONS

ASTM C 618-85 Standard Specification for Fly Ash and Raw Calcined Natural Pozzolan for Use as a Mineral Admixture in Portland Cement Concrete, pp. 385-388 (1985).

* cited by examiner

*Primary Examiner*—Paul Marcantoni
(74) *Attorney, Agent, or Firm*—Wegman, Hessler & Vanderburg

(57) ABSTRACT

A cementitious mixture that is comprised of class C fly ash and other industrial waste product such as either bottom ash or economizer ash. The mixture is preferably 15-35% weight class C fly ash based on the total weight of the mixture. The mixture excludes Portland cement, or other similar cement products. The dry mixture is placed in a desired location or form. Water is then added to the mixture when desired in order to harden the mixture in place. The cementitious mixture is particularly useful for securing fence posts, or the like, in the earth as the workability of the mixture is maintained by adding the water to the mixture only after the position has been properly plumbed and placed in the hole. The cementitious mixture thus provides an inexpensive alternative to standard blended cement products, and provides a convenient and effective way of securing fence posts to the earth.

10 Claims, No Drawings

CEMENTITIOUS MIXTURES AND METHODS OF USE THEREOF

CROSS-REFERENCE TO RELATED APPLICATIONS

This application claims the priority filing benefit of International PCT application PCT/US2004/017304 filed Jun. 2, 2004, and published under PCT 21(2) in the English language; and U.S. Provisional Patent Application Ser. No. 60/475,594 filed Jun. 4, 2003.

FIELD OF INVENTION

This invention relates to a cementitious mixture comprising industrial waste products of the type that include calcium, alumina, and silica. The mixture is comprised of 100% recycled material and is used to anchor structural elements such as a fence post or the like in the ground.

BACKGROUND

Disposal of industrial waste products such as fly ash, bottom ash, economizer ash, cement kiln dust (CKD), steel slag, and blast furnace slag (i.e., iron slag) is problematic. These waste products include significant amounts of calcium, alumina, and silica and are produced in enormous quantities.

Coal combustion by-products such as fly ash, bottom ash, and economizer ash are plentiful and pose a persistent disposal problem. The chemical content and particle size of fly ashes vary widely in accordance with the source of the coal, the fineness to which it is ground and the furnace within which it is burned.

ASTM C 618-85 Standard Specification for Fly Ash and Raw Calcined Natural Pozzolan for Use as a Mineral Admixture in Portland Cement Concrete, pp. 385-388 (1985) has classified fly ash into two classes, class C and class F. Class C fly ash has hardening properties due to its cementitious mineralogy. Class C fly ash typically contains between 70% and 50% by weight of silica, alumina and ferric oxides. Class C fly ash is usually high in calcium and is produced as a by-product of the combustion of lignite or subbituminous coal. Class F fly ash has non-hardening properties due to its pozzolanic mineralogy. Class F fly ash typically contains more than 70% by weight of silica, alumina, and ferric oxides.

According to ASTM C618, the chemical requirements to classify fly ash are as shown in Table 1.

TABLE 1

Chemical Requirements for Fly Ash Classification

| Properties | Fly Ash Class | |
|---|---|---|
| | Class F | Class C |
| Total of Silicon dioxide (SiO$_2$), aluminum oxide (Al$_2$O$_3$), and iron oxide (Fe$_2$O$_3$) min % | 70.0 | 50.0 |
| Sulfur trioxide (SO$_3$) max % | 5.0 | 5.0 |
| Moisture content, max % | 3.0 | 3.0 |

Class F fly ash is produced from burning anthracite and bituminous coals. Some Texas lignites also produce class F fly ash. This fly ash has siliceous or siliceous and aluminous material, which itself possesses little or no cementitious value but will, in finely divided form and in the presence of moisture, chemically react with calcium hydroxide at ordinary temperature to form cementitious compounds. Class C fly ash is produced normally from lignite and subbituminous coals and usually contains significant amount of combined calcium (reported as CaO). This class of fly ash, in addition to having pozzolanic properties, also has some cementitious properties (ASTM C 618-99).

Bottom ash results from the burning of any type of coal. Bottom ash is a sandy, granular or clinkery residue consisting of mostly silicon dioxide and aluminum oxide. Bottom ash can be somewhat pozzolanic, but does not itself harden on contact with water. However, bottom ash in combination with class C fly ash can form chemical bonds that quickly unite and harden. Bottom ash typically collects in the bottom of furnaces and boilers where coal is burned and quenched with water before removal. Reactive cementitious compounds present in the bottom ash usually react during the quenching process.

Bottom ash has been characterized as a dark, gray, granular, porous predominantly sand size minus 12.7 mm (½ in.) material that is collected in a water filled hopper at the bottom of the furnace. Typically, when a sufficient amount of bottom ash drops into the hopper, it is removed via water jets and the like and conveyed by a sluiceway either to a decant basin for dewatering, crushing and stockpiling.

Typical properties of bottom ash are as follows:

TABLE 2

Bottom Ash Particle Size Distribution

| | Bottom Ash | | |
|---|---|---|---|
| Sieve Size | Location #1 | Location #2 | Location #3 |
| 38 mm (1½ in) | 100 | 99 | 100 |
| 19 mm (¾ in) | 100 | 95 | 100 |
| 9.5 mm (⅜ in) | 100 | 87 | 73 |
| 4.75 mm (No. 4) | 90 | 77 | 52 |
| 2.36 mm (No. 8) | 80 | 57 | 32 |
| 1.18 mm (No. 16) | 72 | 42 | 17 |
| 0.60 mm (No. 30) | 65 | 29 | 10 |
| 0.30 mm (No. 50) | 56 | 19 | 5 |
| 0.15 mm (No. 100) | 35 | 15 | 2 |
| 0.075 mm (No. 200) | 9 | 4 | 1 |

TABLE 3

Typical Physical Properties of Bottom Ash

| Property | Bottom Ash |
|---|---|
| Specific Gravity[6] | 2.1-2.7 |
| Dry Unit Weight[6] | 720-1600 kg/m$^3$ (45-100 lb/ft$^3$) |
| Plasticity[6] | None |
| Absorption[4] | 0.8.-2.0% |

Bottom ash is composed primarily of silica, alumina, iron, and calcium with smaller percentages of magnesium, sulfates and other compounds. Table 4 presents a chemical analysis of selected samples of bottom ash from different coal types and regions.

TABLE 4

Chemical Composition of Selected Bottom
Ash Samples (Percent by Weight)[(4)]

| Ash Type: | Bottom Ash | | | | |
|---|---|---|---|---|---|
| Coal Type: | Bituminous | | | Subbituminous | Lignite |
| Location | West Virginia | Ohio | | Texas | |
| $SiO_2$ | 53.6 | 45.9 | 47.1 | 45.4 | 70.0 |
| $Al_2O_3$ | 28.3 | 25.1 | 28.3 | 19.3 | 15.9 |
| $Fe_8O_3$ | 5.8 | 14.3 | 10.7 | 9.7 | 2.0 |
| CaO | 0.4 | 1.4 | 0.4 | 15.3 | 6.0 |
| MgO | 4.2 | 5.2 | 5.2 | 3.1 | 1.9 |
| $Na_{2O}$ | 1.0 | 0.7 | 0.8 | 1.0 | 0.6 |
| $K_{2O}$ | 0.3 | 0.2 | 0.2 | — | 0.1 |

Economizer ash is, as the name suggests, removed from the economizer section of the boiler and typically has high calcium oxide content, high unburned carbon content and comprises course particles that are prone to forming clinkers.

A chemical analysis of one sample of economizer ash is shown in Table 5.

TABLE 5

Typical Economizer Ash

| Constituent | Wt % |
|---|---|
| $SiO_2$ | 33 |
| $Al_2O_3$ | 18 |
| $Fe_2O_3$ | 7 |
| $SO_3$ | 2 |
| CaO | 24 |
| $Na_2O$ | 1 |
| MgO | 4 |

Other compounds such as $TiO_2$, $K_2O$, and $P_2O_5$ etc. are present so as to constitute 100 wt %. Physical particle sizes for this economizer ash are shown in Table 6.

TABLE 6

35% retained on 50 mesh screen
36% of sample between 50 mesh and 200 mesh
29% of sample was less than 200 mesh in size.
Bulk density = 74 lbs. per $ft^3$ Steel slag and blast furnace slag (i.e., iron slag) are other industrial waste by-products that include significant amounts of calcium, alumina, and silica components. In both steel and iron manufacturing processes, the molten metal collects in the bottom of the furnace with liquid iron or steel slag floating on the pool of the desired metal. The slag is collected and presents a disposal problem. It consists primarily of silica and alumina compounds combined with calcium and magnesium oxides.

Similarly, cement kiln dust comprises significant calcium, alumina, and silica components and is an industrial by-product in need of disposal alternatives. Typically, the CKD is collected from both the exit and feed end typically of a rotary cement kiln. The fine particulates are usually collected in high efficiency dust collectors such as fabric filters or electrostatic precipitators.

CKDs are composed of a mixture of sulfates, chlorides, carbonates, and oxides of sodium, potassium, and calcium in combination with quartz, limestone, fly ash, dolomite, feldspars and iron oxides, glasses of silicon dioxide, aluminum oxide, iron oxide, and certain cement compounds.

A need in the art therefore exists for commercially viable products and methods in which waste product materials may be advantageously used so as to minimize disposal concerns. An even more specific need in the art exists for commercially viable products and methods that incorporate coal combustion by-products such as fly ash, bottom ash, and/or economizer ash.

A product and method of use thereof by which 100% of the components are formed from such coal combustion by-products is even more desirable.

DESCRIPTION OF THE INVENTION

This invention provides a cementitious mixture comprising class C fly ash in combination with another industrial waste product that comprises calcium, alumina, and silica. The mixture is formed of 100% recycled waste product material and requires no additional cement or aggregate components. The cementitious mixture may be mixed and provided in dry form in a 50 lb. bag or the like ready for placement of the mixture into a desired location or form.

The dry cementitious mixture is hardened by the addition of water after the mixture has been placed at its desired location. Accordingly, the cementitious mixture of the invention is particularly useful for securing fence posts, or the like, in the earth by mixing the class C fly ash and other waste product material together, positioning a post in a hole in the earth, and filling the hole and surrounding the post in the hole with the dry mixture. Water may be added manually or by nature resulting in setting of the mix and securement of the fence post in the hole. Although it is not necessary in all cases, rocks or large aggregates can be placed around the fence post to maintain it in the proper position during the setting of the cementitious mix.

In various exemplary embodiments of the systems and methods of the invention, the cementitious mixture is comprised of about 5-50 wt %, preferably 15-35 wt %, weight of class C fly ash and the remainder of the mixture is the other waste product material. That is, based on the total weight of the components, the "C" fly ash weighs from 5-50 wt %, preferably 15-35 wt % of the total mix weight. No Portland cement, or other similar cement product, is used to comprise the cementitious mixture of the invention. Additionally, sand or other aggregate is not necessary.

It is preferred to utilize a mixture that includes (1) class C fly ash and (2) a coal combustion by-product such as bottom ash or economizer ash. Compositions that consist essentially of class C fly ash and the aforementioned coal combustion by-products are even more preferred.

Because bottom ash is typically wet, or moist, producing the preferred combination by % weight of the class C fly ash relative to the bottom ash may require additional processing steps. For example, in those embodiments wherein the cementitious mixture is comprised of class C fly ash and bottom ash, the class C fly ash and bottom ash may be first mixed together. The initial mixture of class C fly ash and bottom ash may then react for 24 hours. Thereafter, additional class C fly ash may be added, if needed, to ensure that the ratio of class C fly ash to bottom ash is within the desired weight range as set forth above. Alternatively, the bottom ash may be separately dried before introducing the class C fly ash into the mixture.

In those embodiments wherein the cementitious mixture is comprised of class C fly ash and economizer ash, the class C fly ash and the economizer ash are simply mixed so that the desired class C fly ash weight ratio relative to the total weight of the components is achieved.

The preferred cementitious mixture is comprised totally of coal combustions products such as fly ash, bottom ash and economizer ash to the exclusion of Portland cement, or other similar cement products. As a result, the cementitious mixture of the invention is less expensive than blended cement products containing such Portland cement, or other similar cement products.

The invention will now be further described in conjunction with the appended examples which should be viewed for illustrative purposes only and should not be constituted to limit the invention.

EXAMPLES

Example 1

A mix comprising 80 wt % bottom ash and 20 wt % class C fly ash is prepared and allowed to react for 24 hours. Then sufficient class C ash is added to bring the ratio to 65 wt % bottom ash and 35 wt % class C ash. A sufficient amount of this dry mix is placed in a pre-dug hole and a fence post is placed upright in the hole within the mix. Rainwater will provide requisite moisture to hydrate the cementitious material and secure the post in its intended position.

Example 2

A mix comprising 85 wt % bottom ash and 15 wt % Class C fly ash is prepared and allowed to react for 24 hours. Then, sufficient class C ash is added to the reacted mix to bring the weight ratio of the components to 70 wt % bottom ash and 30 wt % class C fly ash. This dry mix is placed in a hole with a fence post extending upwardly in the hole. Sufficient water is added to the mix and the mix is compacted around the post.

Example 3

A mix comprising 70 wt % economizer ash and 30 wt % class C fly ash is prepared. This mix is placed in a pre-dug hole and the mix is packed around a fence post placed in the hole. Sufficient water is added to the mix to allow it to harden and support the fence post.

It is noted that two types of drying are involved when fly ash/bottom ash mixtures are used. For instance, reaction of the fly ash and bottom ash (wherein the bottom ash may contain moisture such as 10% moisture) can be referred to as chemical drying. Mechanical drying or heat drying involves passing the bottom ash through a dryer and by the use of heat, microwave, or other process evaporating water from the bottom ash.

While the invention has been described in conjunction with the various exemplary embodiments outlined above, it should be appreciated that many alternatives, modifications and variations will be apparent to those skilled in the art. Accordingly, the exemplary embodiments of the invention, as set forth above, are illustrative only, and not limiting. Various changes may be made without departing from the spirit and scope of the invention.

What is claimed is:

1. A cementitious mixture for securing a structural element in the earth, said composition consisting of:
   (a) class C fly ash; and
   (b) a member selected from the group consisting of bottom ash and economizer ash and mixtures thereof, said component (a) being present in an amount of 5-50 wt % based on the total weight of said mixture.

2. The cementitious mixture as recited in claim 1 wherein said component (a) is present in an amount of about 15-35 wt % based on the total weight of said mixture.

3. The cementitious mixture as recited in claim 2 wherein (b) comprises bottom ash and wherein said mixture consists of 100% (a) and (b).

4. A process for securing a structural element in the earth, said process comprising:
   i) positioning said structural element in a hole in said earth;
   ii) filling said hole and surrounding said structural element with a dry cementitious mixture consisting of (a) class C fly ash waste product and (b) another waste product selected from the group consisting of bottom ash, economizer ash, steel slag, blast furnace slag, and cement kiln dust and mixtures thereof, said dry mixture being devoid of any additional cement;
   iii) adding water to said hole; and
   iv) allowing said dry mixture to harden, thereby securing said structural element in said hole.

5. The process as recited in claim 4 wherein said dry cementitious mixture comprises from about 5-50 wt % (a) based on the total weight of said cementitious mixture.

6. Process as recited in claim 5 wherein said industrial waste product (b) is cement kiln dust.

7. Process as recited in claim 5 wherein said industrial waste product (b) is either steel slag or blast furnace slag or mixtures thereof.

8. The process as recited in claim 5 wherein said dry cementitious mixture comprises about 15-35 wt % (a) based on the total weight of said cementitious mixture.

9. The process as recited in claim 4 wherein said (b) is bottom ash.

10. The process as recited in claim 5 wherein said structural element is a fence post.

* * * * *

UNITED STATES PATENT AND TRADEMARK OFFICE
CERTIFICATE OF CORRECTION

PATENT NO. : 7,658,796 B2  
APPLICATION NO. : 10/557756  
DATED : February 9, 2010  
INVENTOR(S) : David H. Nordmeyer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 955 days.

Signed and Sealed this

Thirtieth Day of November, 2010

David J. Kappos  
*Director of the United States Patent and Trademark Office*